US008915710B2

(12) United States Patent
Chaudhry et al.

(10) Patent No.: US 8,915,710 B2
(45) Date of Patent: Dec. 23, 2014

(54) BRUSHLESS DIRECT CURRENT (BLDC) MOTOR BASED LINEAR OR ROTARY ACTUATOR FOR HELICOPTER ROTOR CONTROL

(75) Inventors: Zaffir Chaudhry, South Glastonbury, CT (US); Brian E. Wake, South Glastonbury, CT (US); Fanping Sun, Glastonbury, CT (US); Richard Jeremy Bedwell, Bristol (GB); Jimmy Lin-Min Yeh, West Hartford, CT (US); Lee A. Hoffman, Vernon, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 2159 days.

(21) Appl. No.: 11/299,159

(22) Filed: Dec. 9, 2005

(65) Prior Publication Data

US 2008/0101931 A1    May 1, 2008

(51) Int. Cl.
B64C 27/615        (2006.01)

(52) U.S. Cl.
USPC .............................................. 416/23; 416/24

(58) Field of Classification Search
USPC .................. 244/17.11, 17.13, 99.11, 215; 310/156.53, 156.56; 416/23, 24
See application file for complete search history.

(56) References Cited

U.S. PATENT DOCUMENTS

| | | | |
|---|---|---|---|
| 5,041,748 A | 8/1991 | Huber | |
| 5,320,491 A * | 6/1994 | Coleman et al. | 416/24 |
| 5,387,083 A * | 2/1995 | Larson et al. | 416/23 |
| 5,588,800 A * | 12/1996 | Charles et al. | 416/24 |
| 6,152,692 A * | 11/2000 | Aubry | 416/24 |
| 6,162,313 A | 12/2000 | Bansemir et al. | 156/163 |
| 6,168,379 B1 | 1/2001 | Bauer | 416/23 |
| 6,196,796 B1 | 3/2001 | Lozyniak et al. | 416/24 |
| 6,200,096 B1 | 3/2001 | Kohlhepp | 416/24 |
| 6,295,006 B1 | 9/2001 | Kohlhepp | 340/946 |
| 6,354,536 B1 | 3/2002 | Torok et al. | 244/39 |
| 6,454,207 B1 | 9/2002 | Yamakawa et al. | 244/99.11 |
| 6,474,945 B1 | 11/2002 | Nakasato et al. | 416/23 |

(Continued)

FOREIGN PATENT DOCUMENTS

| | | |
|---|---|---|
| DE | 103 34 267 | 2/2005 |
| GB | 2 348 856 | 10/2000 |
| WO | 0183295 | 11/2001 |
| WO | WO 02/094655 | 11/2002 |

OTHER PUBLICATIONS

European Search Report for European Application No. 06851740.8 dated Oct. 26, 2012.

(Continued)

*Primary Examiner* — Edward Look
*Assistant Examiner* — Aaron R Eastman
(74) *Attorney, Agent, or Firm* — Carlson, Gaskey & Olds, P.C.

(57) ABSTRACT

A device for controlling the pitch of a helicopter's rotor blade, the device having a BLDC motor based actuator; and at least one control surface operatively connected to the BLDC motor based actuator. The actuator and the control surface are preferably fully integrated into the interior profile of the rotor blade and are capable of controlling the PFC of the helicopter and improving HHC during operation by reducing noise and vibration. The motor is preferably a high power density motor incorporating rare earth permanent magnets connected to a roller/ball screw or planetary gear set to provide the right combination of force/torque, stroke and frequency.

17 Claims, 8 Drawing Sheets

(56) References Cited

U.S. PATENT DOCUMENTS

| | | | |
|---|---|---|---|
| 6,478,541 B1 | 11/2002 | Charles et al. | 416/23 |
| 6,481,964 B2 | 11/2002 | Lorkowski et al. | 416/23 |
| 6,499,690 B1 | 12/2002 | Katayama et al. | 244/17.11 |
| 6,508,439 B1 | 1/2003 | Fink et al. | 244/215 |
| 6,513,762 B2 * | 2/2003 | Fink et al. | 244/215 |
| 6,530,542 B2 | 3/2003 | Toulmay | 244/17.13 |
| 6,644,919 B2 | 11/2003 | Bauer et al. | 416/23 |
| 6,648,599 B2 | 11/2003 | Preissler | 416/1 |
| 6,663,345 B2 | 12/2003 | Lorkowski et al. | 416/23 |
| 6,666,648 B2 | 12/2003 | Bernhard et al. | 416/23 |
| 6,769,872 B2 | 8/2004 | Torok et al. | 416/1 |
| 6,806,666 B2 * | 10/2004 | Kim et al. | 318/362 |
| 6,840,741 B1 | 1/2005 | Wake et al. | 416/227 A |
| 6,863,245 B2 | 3/2005 | Gessler et al. | 244/215 |
| 6,932,569 B2 | 8/2005 | Torok et al. | 416/1 |
| 2001/0035477 A1 | 11/2001 | Fink et al. | |
| 2003/0026696 A1 | 2/2003 | Lorkowski et al. | 416/23 |
| 2003/0102410 A1 | 6/2003 | Gessler et al. | 244/215 |
| 2004/0212266 A1 * | 10/2004 | Hans | 310/156.56 |
| 2004/0239199 A1 * | 12/2004 | Qu et al. | 310/114 |
| 2004/0251383 A1 | 12/2004 | McDonnell | 244/82 |
| 2005/0001104 A1 | 1/2005 | Arnaud | 244/215 |
| 2005/0123400 A1 | 6/2005 | Bagai | 416/1 |
| 2005/0151030 A1 | 7/2005 | Arnaud | 244/215 |

OTHER PUBLICATIONS

Dan Patt, et al. "Active Flaps for Noise Reduction: A Computational Study", Jun. 3, 2005.

Friedrich K. Straub, et al. "Design, Development, Fabrication and Testing of an Active Flap Rotor System", Jun. 3, 2005.

Francois Toulmay, et al. "Active Blade Flaps—The Needs and Current Capabilities", May 11, 2001.

"Boeing Tests Piezoelectric Flaps on Helicoptor Rotor". <http://www.vtol.org/news/issues304.html-boeing>.

Peretz P. Friedmann. "Vibration Reduction and Performance Enhancement by Active Control with Noise Constraints", Feb. 18, 2005.

Sorokach Jr., Michael R. "Miniature Linear-to-Rotary Motor Actuator", May 1, 1993.

* cited by examiner

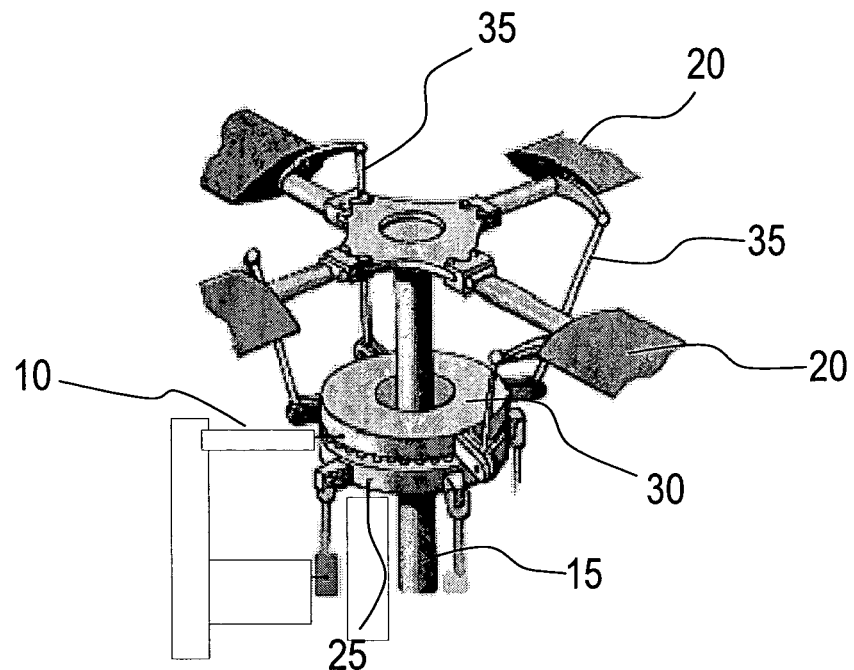
Fig. 1
(Prior Art)
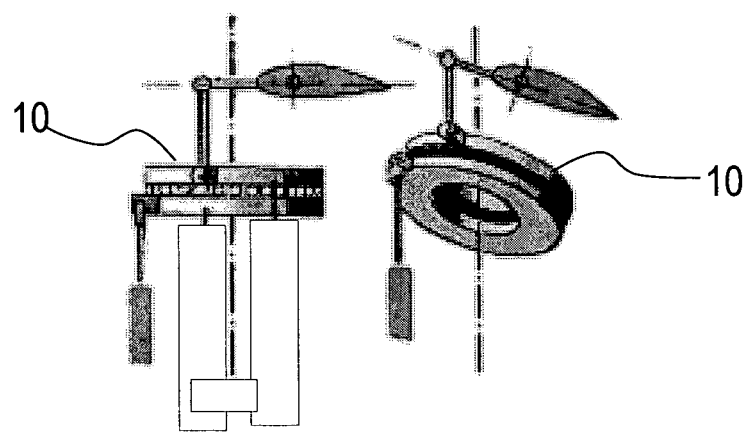
Fig. 2A
(Prior Art)
Fig. 2B
(Prior Art)

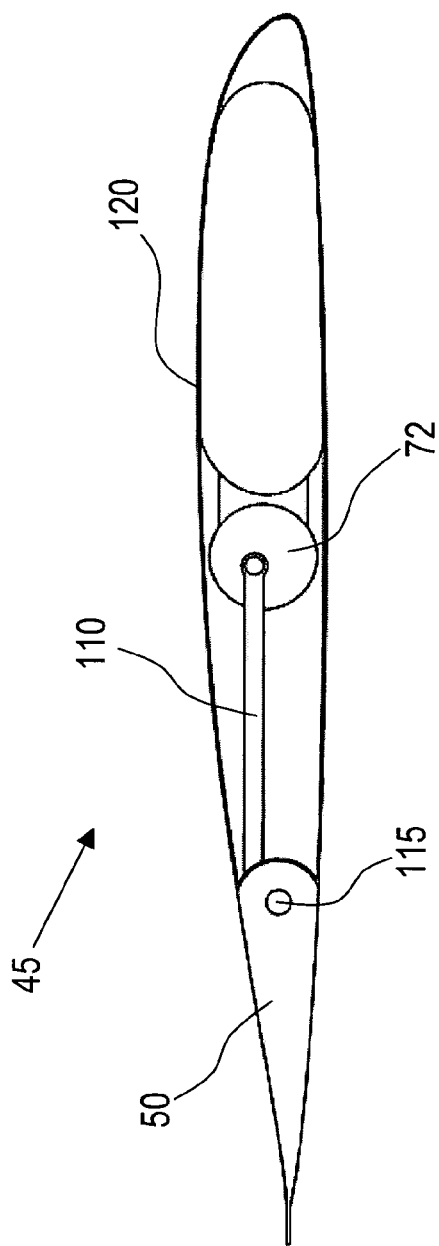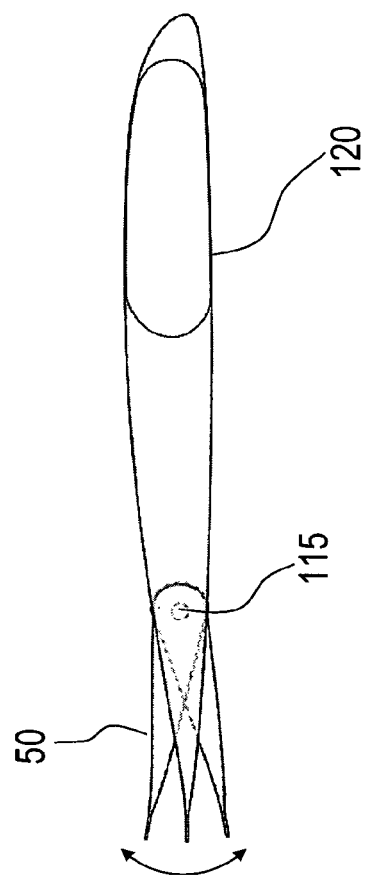
Fig. 7
Fig. 8

BRUSHLESS DIRECT CURRENT (BLDC) MOTOR BASED LINEAR OR ROTARY ACTUATOR FOR HELICOPTER ROTOR CONTROL

CROSS REFERENCE TO RELATED APPLICATION

This application is related to U.S. patent application Ser. No. 0002553USU, filed simultaneously herewith, the contents of which are incorporate by reference herein.

BACKGROUND OF THE INVENTION

1. Field of the Invention

The present invention relates to an actuator for a rotor blade of a helicopter. More particularly, the present invention relates to a BLDC motor based actuator that is integrated in the profile of a rotor blade of a helicopter. Still more particularly, the present invention relates to a BLDC motor based actuator, that is integrated in the profile of a rotor blade of a helicopter, for manipulating active control surfaces that control the orientation of a rotor blade for primary flight control (PFC) and higher-harmonic control (HHC).

2. Description of Prior Art

The performance of a helicopter in the military is highly critical during combat situations and training missions. The operation and performance of particularly, the rotor blades of the helicopter is significant to the overall operation of the helicopter. The vertical lift and the forward and lateral movement of the helicopter are all made possible by the operation of the rotor blades.

A swashplate around the rotating shaft of a helicopter is currently used to mechanically control the movement of individual blades to adjust their pitch around the azimuth for rotor thrust control (tilt of thrust and thrust magnitude). Recently, trailing-edge flaps have been used on the rotor blade in an attempt to control the higher harmonics of the blades during flight to minimize vibration and noise. Such flaps on the rotor blades are not capable of controlling the primary flight characteristics of the rotor blade. Currently, some helicopters in service rely on servo-flaps (attached to trailing edges) for primary flight control but still use the swashplate to transmit flight control commands to the flaps. However, rapid operation of the flaps to manipulate the orientation of the rotor blade for primary flight control as well as the higher harmonic control is needed.

Therefore, there exists a need for a device that can rapidly adjust the control surfaces, leading edge slats and trailing edge flaps, of the rotor blades of a helicopter to provide improved thrust and efficiency and to control the orientation of the blades to decrease the noise and vibration. Additionally, such a device preferably is fully integrated in the rotor blade of a helicopter.

SUMMARY OF THE INVENTION

It is an object of the present invention to replace the swashplate of a helicopter with a mechanism that is capable of controlling the primary flight control (PFC) and/or the higher harmonic control (HHC) of the rotor of a helicopter.

It is also an object of the present invention to replace the swashplate of a helicopter with a mechanism that is preferably a fully integrated system which completely fits within the interior profile of the rotor blade.

It is a further object of the present invention to replace the swashplate of a helicopter with trailing-edge flaps on the rotor blades whose movement is controlled by a BLDC motor based actuator.

It is yet a further object of the present invention to reduce the overall weight, drag, noise and vibration of the rotor of a helicopter by replacing the swashplate of the rotor with flaps that are actuated by a BLDC motor based actuator that preferably includes a high power BLDC motor operatively connected to a roller or ball screw, or a, a planetary gear set, to achieve the right combination of force/torque, stroke and frequency required for moving the rotor flaps. Preferably, the high power BLDC motor incorporates rare earth magnet technology, such as NdFeB, Samarium Cobalt, etc.

It is still yet a further an object of the present invention to control the actuation of the rotor flaps with a BLDC motor based actuator having sufficient force and torque such that it is capable of effecting both PFC and HHC of the rotor blades.

It is a yet a still further object of the present invention to incorporate, either alone or in combination with the trailing edge flaps, slats on the leading edge of a rotor blade for enhancing rotor thrust and efficiency. The leading edge slats being operatively controlled by a BLDC motor based actuator.

It is still yet another object of the present invention to provide a BLDC motor based actuator that is capable of adjusting the pitch of the rotor blades of a helicopter several times, for example 2 p-5 p, during a single rotation of the rotor of a helicopter.

It is also an object of the present invention to simultaneously reduce the noise and vibration associated with the rotary blades of a helicopter and to provide PFC.

It is also a further object of the present invention to provide a BLDC motor based actuator that is capable of being fully integrated in the interior profile of the rotor blade and which is capable of moving the leading edge slats of the rotor blade to improve PFC of the entire rotor.

It is yet another object of the present invention to simultaneously improve PFC and/or HHC using a BLDC based actuator motor to control leading edge slats and/or trailing edge flaps on a rotor blade of a helicopter.

These and other objects and advantages of the present invention are achieved by the present invention that provides a device for manipulating a blade of a helicopter having a BLDC motor based actuator; and at least one control surface operatively connected to the actuator. The actuator and the control surface are preferably fully integrated into the interior profile of the rotor blade and are capable of exerting HHC during operation to reduce noise and vibration and/or PFC. The BLDC motor based actuator preferably includes a high power density motor incorporating rare earth permanent magnets.

BRIEF DESCRIPTION OF THE DRAWINGS

FIG. 1 illustrates a partial perspective view of a swashplate of the prior art around the main rotor shaft of a helicopter FIG. 2a and 2b illustrate a swashplate of the prior art at different orientations to control the position of the rotor blade of the helicopter;

FIG. 7 illustrates a schematic cross-section view of a rotor blade incorporating the BLDC motor based actuator of FIG. 5 of the present invention;

FIG. 8 illustrates a schematic cross-section view of different positions of the trailing edge flap being controlled the BLDC motor based actuator of FIG. 5 of the present invention;

DETAILED DESCRIPTION OF THE INVENTION

Figure 3:
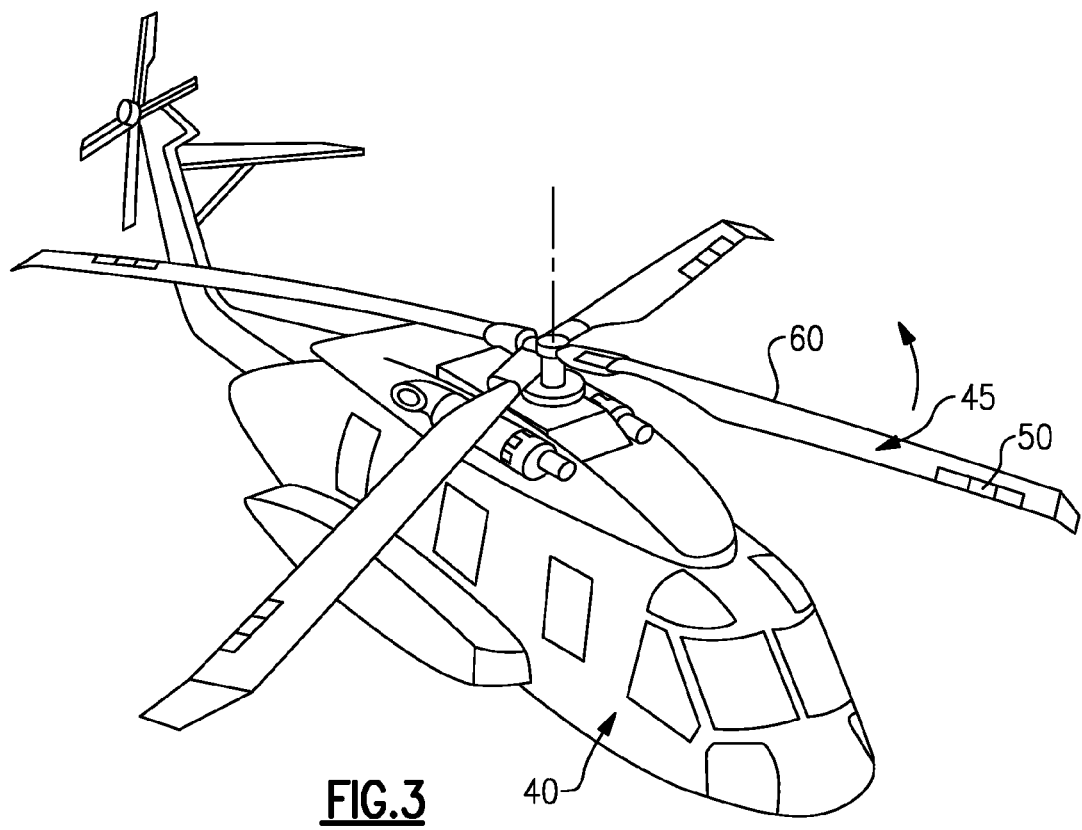
FIG. 3 illustrates a perspective view of the rotor blades of a helicopter having on-board flaps controlled by the BLDC motor based actuator of the present invention.

For the purpose of promoting an understanding of the principles of the present invention, reference will now be made to exemplary, non-limiting embodiments. Referring to the drawings and in particular to FIG. 1, there is illustrated a swashplate of the prior art generally represented by reference numeral 10. A swashplate 10 is a mechanical device for transmitting helicopter rotor control commands from a fixed frame to a rotating frame in order to control the rotor blades 20, which are connected to the main rotor shaft 15. The swashplate 10 generally includes a stationary portion 25 and a rotating portion 30. The stationary portion 25 controls the angle of the rotating portion 30. The rotating portion 30 of the swashplate 10 rotates with the main rotor shaft 15 and controls the pitch of the rotor blades 20 by way of blade pitch links 35.

Generally speaking, incorporation of the swashplate 10 limits the number of independent channels and frequencies at which the commands can be transmitted to the rotor blades 20. In addition, swashplates 10 also increase aerodynamic drag, add bulk to the rotor profile and contribute substantially to the overall weight of the helicopter. FIGS. 2a and 2b illustrate a swashplate 10 of the prior art at different orientations to control the position of the rotor blade of a helicopter.

Figure 4:
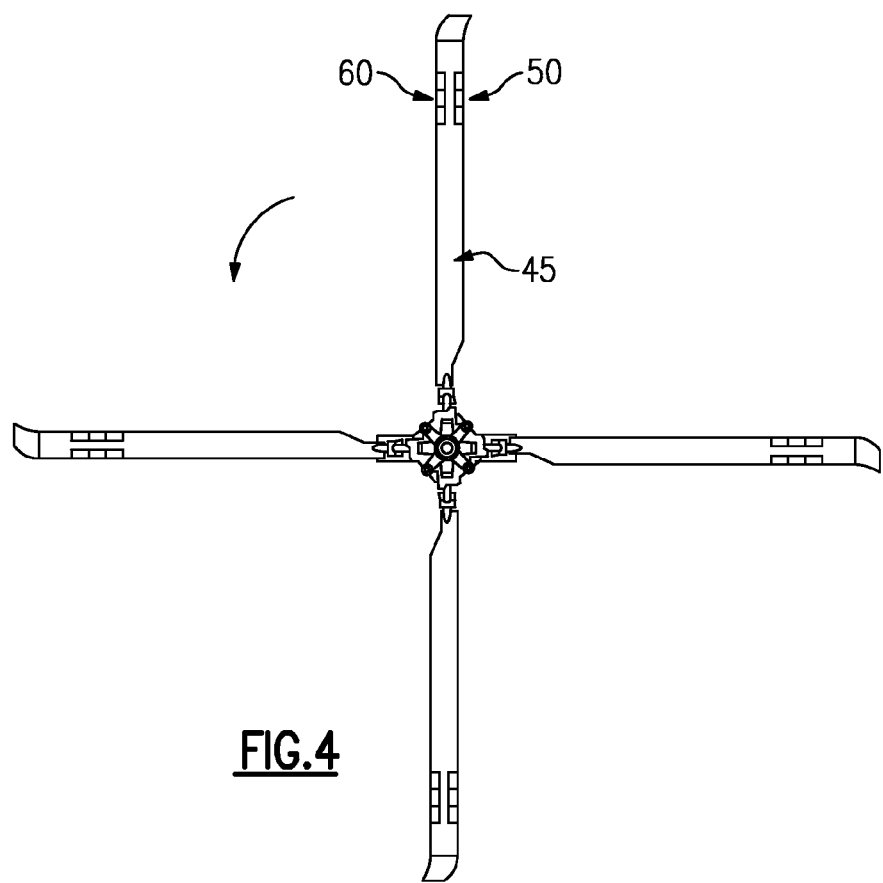
FIG. 4 illustrates a top view of a helicopter rotor having on-board flaps and leading-edge slats controlled by the BLDC motor based actuator of the present invention.

Referring to FIGS. 3 and 4, a helicopter 40 having rotor blades 45 and trailing edge flaps 50 is shown. In accordance with the principles of the present invention, the pitch of the flaps 50 is preferably controlled by a BLDC motor based actuator. The swashplate of the prior art has been eliminated and replaced by rotor blade flaps 50 that are controlled by BLDC motor based actuators. Although the present invention is shown and discussed in terms of having trailing edge flaps 50, it should be noted, as will be discussed in greater detail below, that the rotor blades 45 may incorporate, either alone or in combination, leading edge slats 65 which are disposed on the leading edge 60 of the rotor blades 45. The leading edge slats 65 are generally used to impart enhanced performance by delaying retreating blade stall. Control surfaces will be used herein to collectively define trailing edge flaps 50 and leading edge slats 60.

Figure 5:
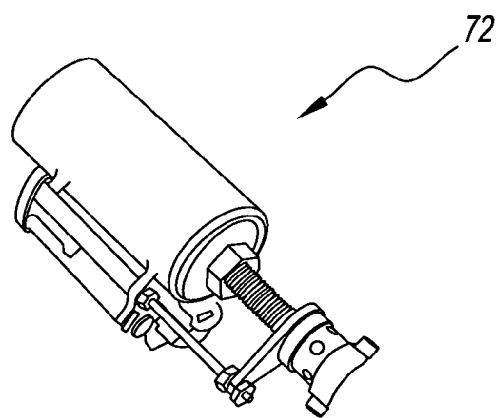
FIG. 5 illustrates a BLDC motor based actuator in accordance with the present invention, the housing of the BLDC motor based actuator being connected to a roller screw for converting rotary motion into linear motion to provide the correct combination of stroke, force and frequency needed to move the active control surfaces.
Figure 6:
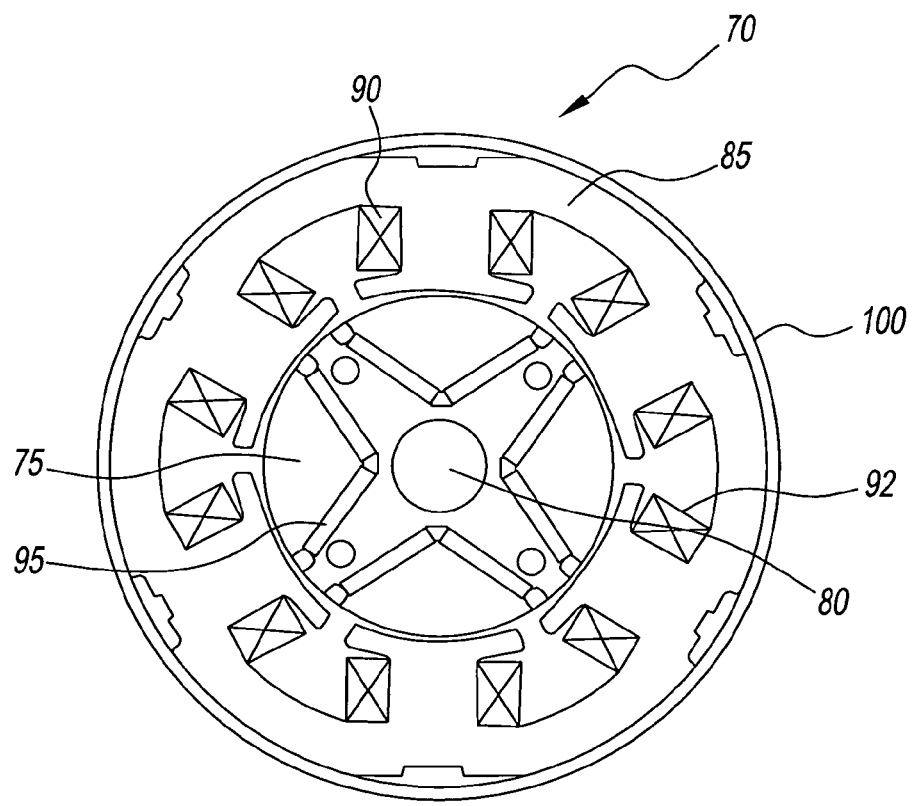
FIG. 6 illustrates a cross-section view of a BLDC motor of the present invention.
Figure 9:
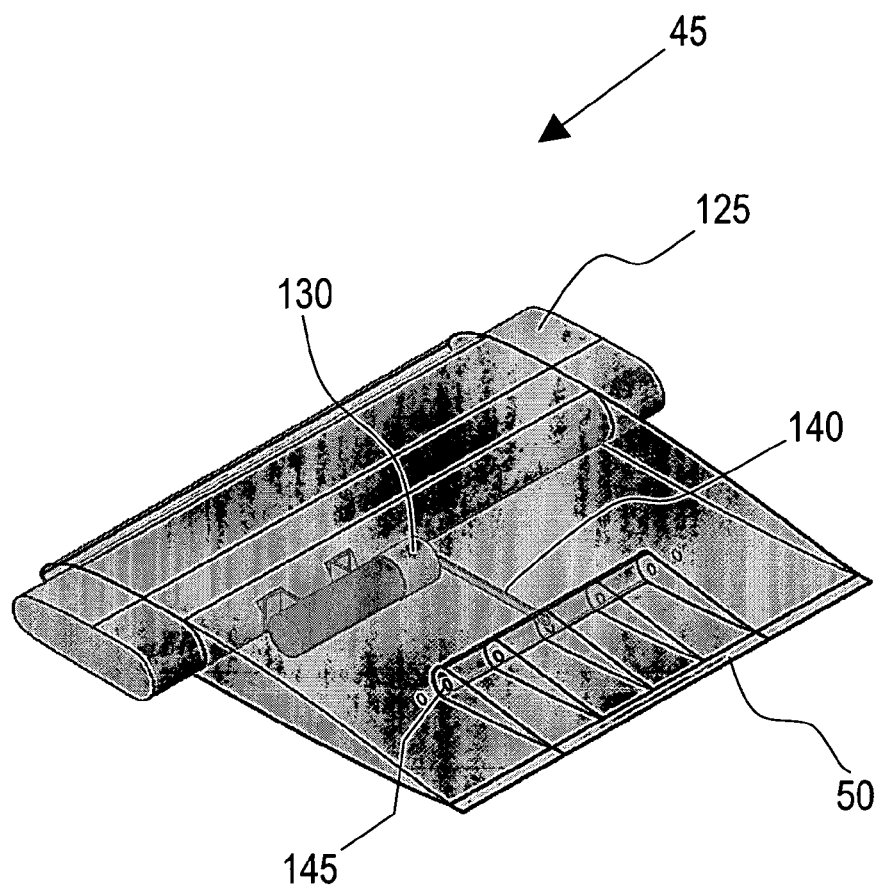
FIG. 9 illustrates a perspective view of the BLDC motor based actuator of FIG. 5 of the present invention connected to a trailing edge flap according to the first embodiment of the present invention.
Figure 11:
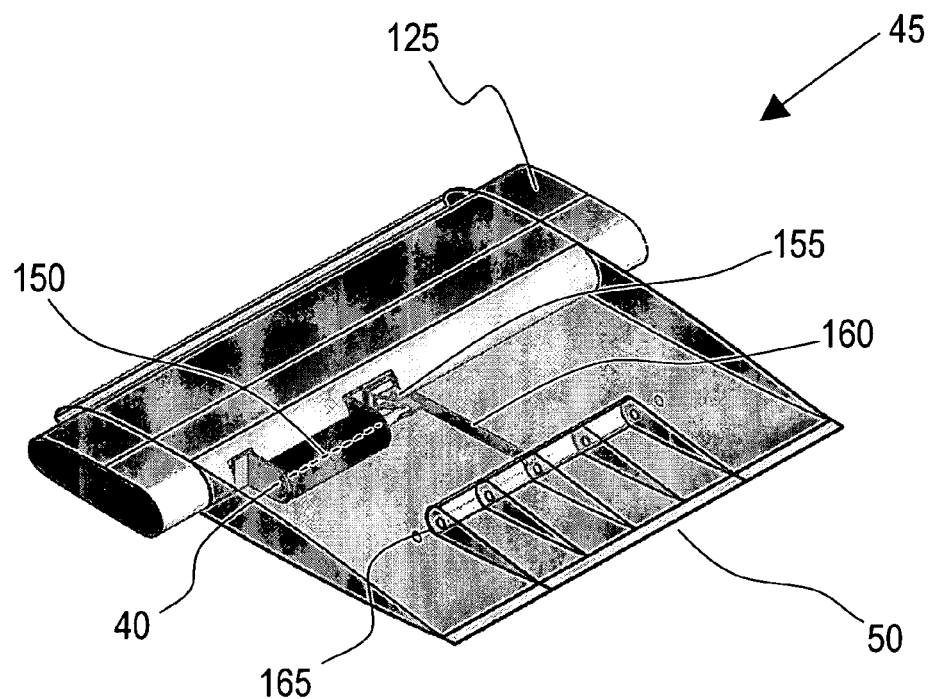
FIG. 11 illustrates a perspective view of a BLDC motor based actuator connected to a trailing edge flap according to a second embodiment of the present invention.
Figure 12:
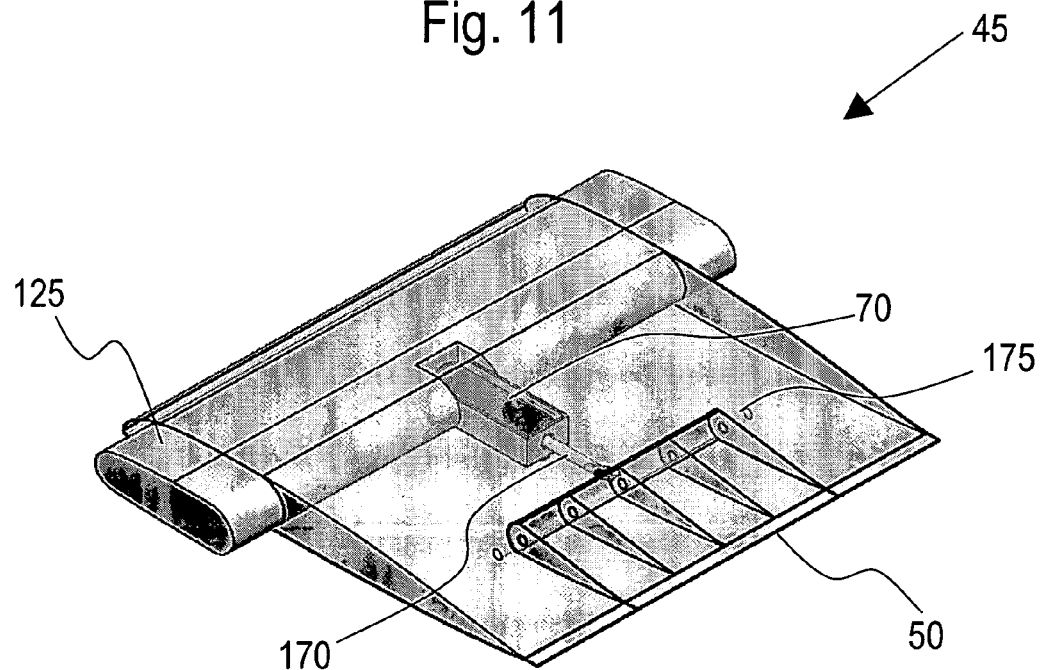
FIG. 12 illustrates a perspective view of a the BLDC motor based actuator connected to a trailing edge flap according to the third embodiment of the present invention.

As shown in FIGS. 5 and 6, the BLDC motor based actuator 72 preferably includes a BLDC motor 70 and a roller/ball screw for converting and delivering motion to the control surfaces. Alternatively, the BLDC motor 70 may be operatively connected to a planetary gear set, to drive the control surfaces with rotary motion. In accordance with the present invention and as discovered by the present inventors, the combination of a high power BLDC motor and a roller/ball screw permits the BLDC motor based actuator to provide sufficient force, torque, stroke, and frequency (i.e., speed) to allow the BLDC motor based actuator to be used to control the helicopter's PFC in combination with it's HHC. Moreover, as shown in FIGS. 9, 11 and 12, for example, the combination of a BLDC high power motor and roller/ball screw permit the BLDC motor based actuators to generate sufficient force, torque, stroke, and frequency to effect the drive of the control surfaces while still enabling the BLDC motor based actuator to be a fully integrated system which completely fits within the interior profile of the rotor blades.

In FIG. 6, the BLDC motor 70 of the present invention generally includes a rotor 75, a shaft 80 that is operatively connected to the rotor 75, a stator 85 and a plurality of coils 90. The coils 90 are preferably in close proximity to the stator 85 and permanent magnets 95. The motor 70 preferably has a stator 85 that is external to the magnets 95 when generally compared to brushed motor configurations.

The coils 90 offer low thermal resistance because they are preferably closely coupled to the housing 100. The positioning of the coils 90 enhances the forced air cooling which is essential when integrating a high power density motor into the housing 100. The coils 90 are preferably external to the permanent magnets 95 and permit a substantial amount of their surface area to be exposed to air to permit rapid heat transfer. The rapid heat transfer from the coils 90 permits substantial amount of power to be extracted from the motor 70 when generally compared to a similar motor having interior coils. The increased power generated by the motor 70 enables increased torque to be transmitted to the linear or rotary output rod or shaft 80.

The permanent magnets 95 are preferably rare earth magnets that generate an increase in energy density. The magnets 95 are characterized by higher magnetic flux density and much higher coercive field strength or coercivity as compared to prior art ferro-magnets. Generally speaking, the higher the remanent magnetic flux density and coercivity, the higher the energy density of the permanent magnets 95. The increased power density allows increased power and torque to be obtained from the BLDC motor 70. The motor 70 preferably uses Neodymium-Iron-Boron (NdFeB) permanent magnets although other magnets of similar rare earth metals could also be used to achieve a similar high power density, such as Samarium Cobalt magnets.

Referring to FIG. 7, a schematic view of the blade 45, is shown. As shown, the blade 45 includes a BLDC motor based actuator 72 that imparts either a rotational or linear motion via a link 110 to control the movement of the trailing edge flap 50. The flap 50 is positioned on a shaft 115 to permit rotation about the shaft 115 to modify the pitch of the blade 45, as shown in FIG. 8. As previously described, the actuator 72 and flap 50 are preferably fully integrated into the interior profile 120 of the blade 45. By being fully integrated into the interior profile 120 of the blades 45, the actuators 50 permit optimal aerodynamic performance and drag reduction.

Referring to FIGS. 9 and 11 through 12, different actuator configurations and flaps 50 are shown being integrated into the rotor blade 45. To date, the compact arrangements of the actuators and flaps 50 have not been possible using other motor technologies for primary flight control. Specifically, piezo actuators do not offer the power density necessary to move the control surfaces to control the helicopter's PFC. Other types of actuators cannot deliver the same force and stroke that is possible by the compact BLDC motor based actuator of the present invention.

Figure 10:
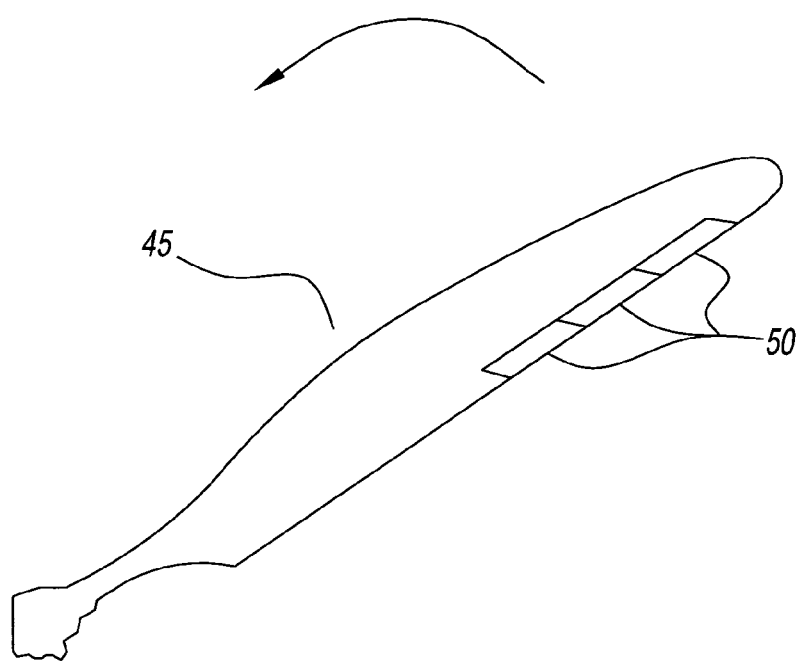
FIG. 10 illustrates a perspective view of a single rotor blade having three integral flaps that are each preferably controlled by independent BLDC motor based actuators of the FIG. 5 of the present invention.

In FIG. 9, the actuator 130 is located parallel to the spar element 125 of the rotor blade 45. As generally understood by one of ordinary skill in the art, the spar element 125 is a structural member located within the rotor blade 45. As shown, the actuator 130 is preferably attached to the spar 125 which enables the spar 125 to provide the stiff back reaction so that the actuator can deliver the necessary force/torque to drive the control surfaces. Positioning the actuator 130 proximate to the spar 125 also ensures that the center of gravity of the rotor blade is toward the forward chordwise portion of blade 45. As shown, the actuator 130 is configured as a rotary actuator that is connected to a link 140 such that motion imparted by the actuator drives the trailing edge flap 50 such that it rotates about the shaft 145. The shaft 145 rapidly effects the deployment of the flap 50 and changes the orientation or pitch of the blade 45 during its rotation. As shown in FIG. 10, a plurality of flaps 50 may be located on each rotor blade 45 to substantially modify the pitch of the blade 45. Power generated by the actuator 130 permits multiple pitch changes of the blade during a single revolution of the helicopter rotor. Were actuator 130 not capable of generating sufficient torque accompanied by high speed, multiple pitch changes during a single rotor rotation would not be possible.

The motor controlled flaps 50 replace the primary flight control (PFC) function of the swashplate and provide the ability for higher harmonic control (HHC) to the helicopter 40. The PFC relates to the lift of the aircraft that results in the vertical and translational movement of the helicopter through the magnitude and tilt of the rotor thrust. Additionally, flaps motorized in accordance with the present invention can change the individual orientation of the blade 45 at higher harmonics as it rotates to improve rotor performance. Moreover, replacement of the swashplate with a compact actuator system that fits within the interior profile of the blade reduces the overall weight of the helicopter by approximately 5% which permits for a greater range, increased payload and greater maneuverability of the helicopter.

By controlling the helicopter's HHC, the motor 70 also reduces the overall noise and vibration of the helicopter 40. Helicopter vibration and noise may be caused by factors such as the interaction of the helicopter's blades 45 with concentrated air disturbances called vorticies that form at the tips of the blades 45 during rotation. The motors 70 and flaps 50 may be controlled by sensors on the blades or fuselage 45 so that the blades are moved in such a manner to minimize the blade's interaction with such vortices. The decreased blade/vortex interaction reduces the helicopter's noise by approximately 5 dB and the helicopter's vibration by approximately 80%. The reduction of the vibration contributes to the reduction of maintenance costs and extends the life of the airframe and airframe components.

Referring to FIG. 11, a second embodiment of the actuator 150 is shown wherein the BLDC motor based actuator 150 incorporates a linear movement. As shown, the actuator 150 is preferably connected to a crank 155 to effect movement of a link 160 in a direction perpendicular to the spar 125. The link 160 moves the trailing edge flap 45 to effect rotation about shaft 165 in order to change the pitch of the blade 50.

Referring to FIG. 12, a third embodiment of the actuator 170 is shown wherein the BLDC motor based actuator 170 directly moves the flap 50 such that it rotates around the shaft 175 to permit the pitch of the blade 45 to change. In this embodiment, the motor is perpendicular to the spar 125.

Figure 13:
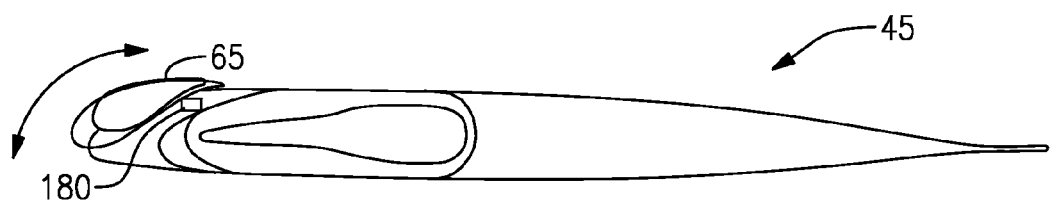
FIG. 13 illustrates a side cross-section view of a rotor blade having a leading edge slat controlled by a BLDC motor based actuator of the present invention.
Figure 14:
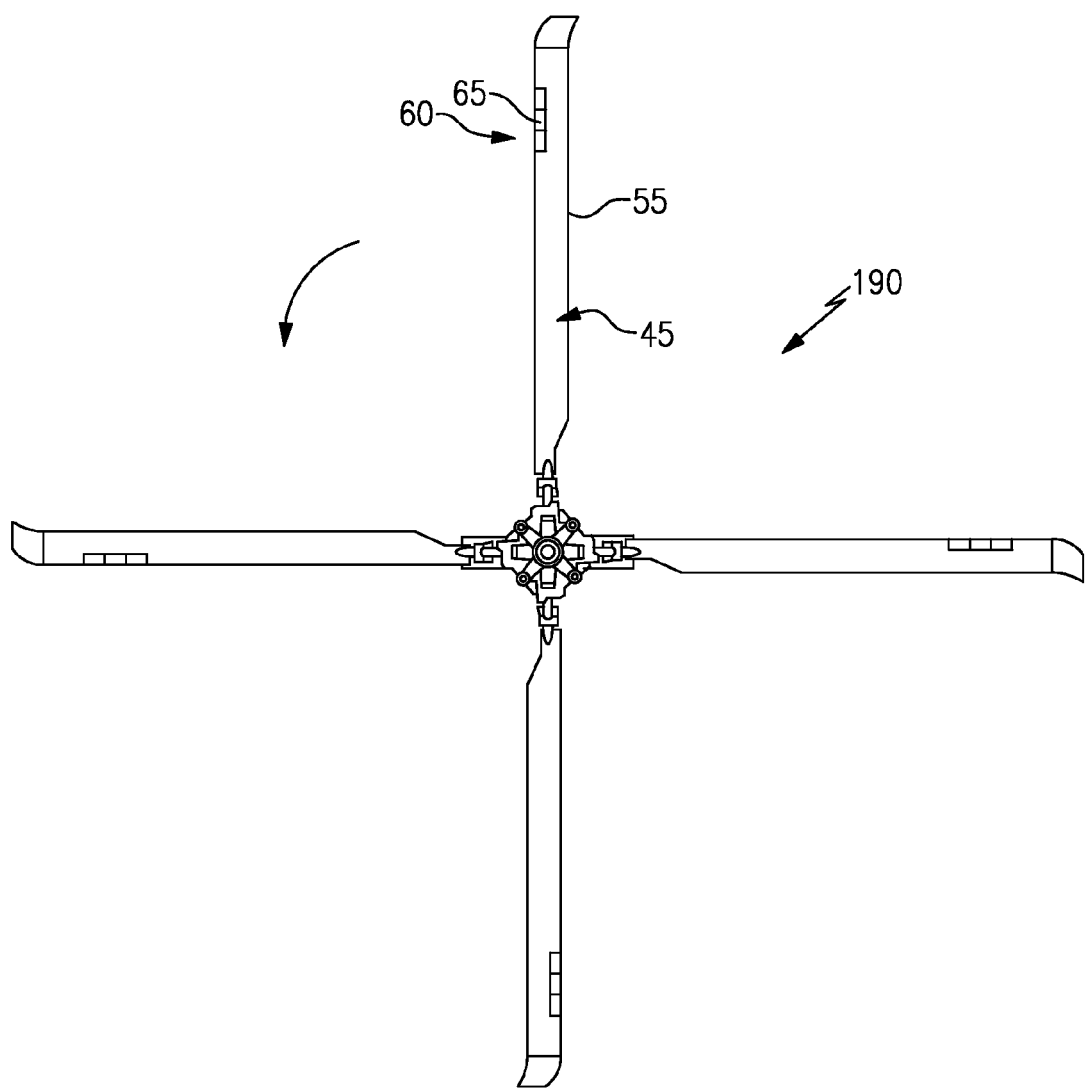
FIG. 14 illustrates a rotor blade of a helicopter having leading edge slats and trailing edge flaps controlled by BLDC motor based actuators of the present invention.

Referring to FIGS. 13 and 14, the BLDC motor based actuator 180 may also be used to drive leading edge slats 65 located on the leading edge of the rotor blades. To date, leading edge slats have not been used on helicopters because their benefits on the retreating side (high lift) were negated by the drag that occurs on the advancing side of the rotor (drag at high Mach number). Active leading slats have been recently conceived as a method to reduce the drawbacks associated with fixed leading edge slats on helicopter rotors. The active leading-edge slats are more effective than fixed leading edge slats because they achieve the high-lift benefits on the retreating side of the rotor, while reducing the drag penalties on the advancing side of the rotor. However, the challenge associated with active leading-edge slats is to move them at the frequency of once per revolution. This is a challenge due to the high loads carried by the leading-edge slat. The high power density BLDC motor based actuators of the present invention can meet the force/stroke requirements of active leading slats. That is, the actuators 180 are capable of overcoming the immense wind pressure on the flaps necessary to move the leading edge slats 65. Leading edge slats 65, that are powered by BLDC motor based actuators 180, may significantly influence PFC of the helicopter and thus enhance flight performance. Use of active leading edge slats 65 may also achieve increased flight speed by up to 75% in hot/high conditions at maximum gross weight, provide a 40% increase in range, and a 30% increase in time on station. These benefits help achieve and improve hover performance.

The BLDC motor based actuator 180 overcomes the problems associated with conventional helicopter rotors by substantially reducing retreating blade stall (RBS) at a given thrust and speed condition, or conversely, extend the stall limit to higher thrusts and/or speeds. Minimizing RBS improves the thrust, speed and maneuverability of a helicopter. The transition between a high lift blade 45 on the retreating side to a low-drag design on the advancing side of rotor 190 by rotation of the leading edge slat is necessary to reduce drag. The high speed change of slat 65 position requires a tremendous amount of force in a short time period. A BLDC motor based actuator in accordance with the present invention can provide the necessary required force. Other types of actuators using different motor technology, as discussed above, do not provide the power density delivered by the BLDC based motor actuator 180 and therefore can not generate the necessary power to move the leading edge slat in the required amount of time. The ability of the BLDC motor based actuator to deliver high power density at the leading edge is significant because the PFC characteristics are tremendously impacted.

Referring to FIG. 14, a rotor blade may incorporate, either singular or in combination, leading edge slats 65 and trailing edge flaps 50, as shown in FIG. 4, wherein each slat/flap is driven by independent BLDC motor based actuators, to optimize rotor performance. The leading edge slats 65 enhance PFC and reduce RBS to make helicopters more maneuverable. Trailing edge flaps 50 driven by the BLDC motor based actuator enhance PFC and HHC to reduce vibration and noise.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

We claim:

1. A device for manipulating a rotor blade of a helicopter comprising:
    a brushless direct current (BLDC) motor based actuator which includes a brushless direct current (BLDC) motor rotationally operable to drive a linkage, and at least one control surface operatively connected to said brushless direct current (BLDC) motor based actuator through said linkage, said brushless direct current (BLDC) motor based actuator operable to provide Primary Flight Control (PFC) through said at least one control surface wherein said brushless direct current (BLDC) motor based actuator is fully integrated into an interior profile of a rotor blade; and
    wherein said linkage includes a roller/ball screw.

2. The device for manipulating according to claim 1, wherein said brushless direct current (BLDC) motor comprises: a rotor, a rotor shaft operatively connected to said rotor, a stator, coils proximate said stator, and at least one permanent magnet, said stator external to said at least one permanent magnet.

3. The device for manipulating according to claim 2, wherein said at least one magnet rotates on said shaft and said coils are stationary during operation.

4. The device for manipulating according to claim 3, wherein said at least one magnet is a rare earth magnet.

5. The device for manipulating according to claim 4, wherein said rare earth magnet is selected from the group consisting of neodymium-iron-boron (NdFeB) magnets and Samarium-Cobalt magnets and any combinations thereof.

6. A device for manipulating a rotor blade of a helicopter comprising:
    a brushless direct current (BLDC) motor based actuator which includes a brushless direct current (BLDC) motor rotationally operable to drive a linkage;
    at least one control surface operatively connected to said brushless direct current (BLDC) motor based actuator through said linkage, said brushless direct current (BLDC) motor based actuator operable to provide higher harmonic control (HHC) through said at least one control surface wherein said brushless direct current (BLDC) motor based actuator is fully integrated into the interior profile of a rotor blade;
    a linkage operatively connected to said actuator and said control surface; and
    wherein said brushless direct current (BLDC) motor comprises a rotor, a rotor shaft operatively connected to said rotor, a stator, coils proximate said stator, and at least one permanent magnet, said stator external to said at least one permanent magnet.

7. The device for manipulating according to claim 6, wherein said at least one permanent magnet rotates on said shaft and said coils are stationary during operation.

8. The device for manipulating according to claim 6, wherein said at least one magnet is a rare earth magnet.

9. The device for manipulating according to claim 8, wherein said at least one rare earth magnet is selected from the group consisting of neodymium-iron-boron (NdFeB) magnets and samarium-cobalt magnets and any combinations thereof.

10. A device for independently manipulating each of the rotor blades of a helicopter, each of the rotor blades having a to a surface, a bottom surface, a leading edge, a trailing edge and an interior profile defined by said top surface, said bottom surface, said leading edge, and said trailing edge, said device comprising:
    a plurality of control surfaces operatively connected to each of the rotor blades;
    each of said plurality of control surfaces operatively connected to a brushless direct current (BLDC) motor based actuator which includes a brushless direct current (BLDC) motor and a linkage such that rotation of said brushless direct current (BLDC) motor moves said control surface through said linkage to provide primary flight control (PFC), each of said brushless direct current (BLDC) motor based actuators fully integrated into the interior profile of a rotor blade; and
    wherein said brushless direct current (BLDC) motor includes a rotor, a rotor shaft operatively connected to said rotor, a stator, coils proximate said stator, and at least one permanent magnet, said stator external to said at least one permanent magnet.

11. The device for manipulating according to claim 10, wherein said plurality of control surfaces are flaps on the trailing edge of each of the rotor blades.

12. The device for manipulating according to claim 10, wherein said at least one magnet is a high power density magnet selected from the group of materials consisting of neodymium-iron-boron (NdFeB) magnets and samarium-cobalt magnets and any combinations thereof.

13. A rotor blade comprising:
    a control surface;
    a brushless direct current (BLDC) motor, said brushless direct current (BLDC) motor fully integrated within an interior profile of the rotor blade, said brushless direct current (BLDC) motor includes a rotor, a rotor shaft connected to said rotor, a stator, coils mounted to said stator, and at least one permanent magnet which rotates with said shaft, said stator external to said at least one permanent magnet; and
    a linkage rotated by said shaft to move said control surface, said linkage fully integrated within said interior profile of the rotor blade.

14. The rotor blade according to claim 13, wherein said coils are rotationally stationary.

15. The rotor blade according to claim 13, wherein said control surface is a flap on a trailing edge of the rotor blade.

16. The rotor blade according to claim 13, wherein said control surface is a slat on a leading edge of the rotor blade.

17. The rotor blade according to claim 13, wherein said linkage includes a roller/ball screw.

* * * * *